United States Patent [19]

Asano

[11] Patent Number: 4,796,093
[45] Date of Patent: Jan. 3, 1989

[54] METHOD AND SYSTEM OF DRIVING LIGHT SOURCE

[75] Inventor: Fumio Asano, Kanagawa, Japan

[73] Assignee: Fuji Xerox Co., Ltd., Japan

[21] Appl. No.: 869,593

[22] Filed: Jun. 2, 1986

[30] Foreign Application Priority Data

Jun. 10, 1985 [JP] Japan .................. 60-125783

[51] Int. Cl.⁴ .................................. H04N 1/00
[52] U.S. Cl. ...................... 358/280; 358/294; 315/362
[58] Field of Search ........... 355/69; 315/169.3, 169.4, 315/360, 362; 358/256, 280, 294

[56] References Cited

U.S. PATENT DOCUMENTS

| | | | |
|---|---|---|---|
| 3,869,644 | 3/1975 | Yamo et al. | 315/169.4 |
| 3,988,536 | 10/1976 | Movicca | 315/169.3 X |
| 4,152,626 | 5/1979 | Hatta et al. | 340/805 X |
| 4,210,848 | 7/1980 | Juyuhi et al. | 315/169.3 |
| 4,327,309 | 4/1982 | Wallot | 315/362 |
| 4,438,374 | 3/1984 | Karius | 315/360 |
| 4,443,741 | 4/1984 | Tamaka et al. | 315/169.3 X |
| 4,459,514 | 7/1984 | Movinoto et al. | 315/169.3 X |
| 4,479,120 | 10/1984 | Ohba et al. | 315/169.3 X |
| 4,535,341 | 8/1985 | Kun et al. | 315/169.3 X |

FOREIGN PATENT DOCUMENTS 2950316 6/1981 Fed. Rep. of Germany .
3205653 8/1982 Fed. Rep. of Germany .

OTHER PUBLICATIONS

German Office Action dated Oct. 20, 1987.
Translation of the German Office Action supplied by the Japanese Patent Attorney for the Assignee of the U.S. and German applications.

*Primary Examiner*—Edward L. Coles, Sr.
*Attorney, Agent, or Firm*—Welsh & Katz

[57] ABSTRACT

A voltage having a polarity opposite to that of a voltage used applied to a light source in a period for reading or recording of a picture image is applied to the light source during predetermined periods other than the operational period to realize restoration of luminance of the light source, prolongation of operational life of the light source and high speed reading or recording speed.

16 Claims, 3 Drawing Sheets

1: LIGHT-UP
0: EXTINGUISH

METHOD AND SYSTEM OF DRIVING LIGHT SOURCE

BACKGROUND OF THE INVENTION

1. Field of the Invention

The present invention relates to a method and a system of driving a light source for reading or recording in facsimile equipment, optical character readers (OCR) or various types of optical printers which optically read or record a picture image and, more specifically, to an improvement in the control of an application voltage to a light source to prevent the decrease of the luminance of the light source with time.

2. Description of the Related Art

Picture reading apparatus such as facsimile equipment or an OCR is well known wherein a photoelectric converting element such as a contact type image sensor is used to optically read a picture. It is also well known to provide a picture recording apparatus such as an optical printer wherein a light sensitive drum is charged uniformly and exposed with an optical image to form an electrostatic latent image thereon, said electrostatic latent image is developed by toner and said toner is transferred onto a paper for recording of the picture image. These picture reading apparatus and picture recording apparatus require a light source as an essential optical element in addition to a contact type image sensor and a light sensitive drum. For example, the picture reading section of the facsimile equipment is arranged as shown in FIG. 5 and includes a fluorescent indicator tube 1 as a light source. The fluorescent indicator tube 1 is lit up in synchronism with moving of an original paper 2 to illuminate the paper 2. Light reflected by the paper 2 is passed through a lens 3 known as a SELFOX lens and an optical image is focused on photoelectric converting elements 40 of an image sensor 4 and converted to an electric signal according to the density of the original image. This electric signal is amplified and calculated by a group of driver IC's 41 and then stored in a memory section (not shown) or the like, completing the reading operation of the picture. Referring to FIG. 6, the fluorescent indicator tube 1 comprises a two-electrode vacuum tube which has filaments 10, terminals 11 and an anode 12 on which phosphor 13 such as zinc oxide (ZnO) is coated. In operation, thermions emitted from the filaments 10 are accelerated by a voltage applied from the terminals 11 to the anode 12 to excite the phosphor 13, thus lighting up the indicator tube 1.

In case of an optical printer, the optical picture recording section is arranged as shown in FIG. 7 or 8. FIG. 7 uses such a fluorescent indicator tube as mentioned above or a DC type EL panel 5 while FIG. 8 uses a dot array fluorescent light source 6 comprising a plurality of light source dots as a light source of the optical section. More specifically, in the optical printer having such an arrangement as shown in FIG. 7, light emitted from, for example, the DC type EL panel 5 is focused on a light sensitive drum 52 through a shutter array (for example, a PLZT shutter array or liquid crystal shutter array) 50 electro-optically opened according to the picture image and through a condensing lens 51. In the optical printer of such an arrangement as shown in FIG. 8, on the other hand, the respective dot light sources of the fluorescent indicator tube dot array 6 are lit up selectively according to the picture image so that light emitted from the dot light sources forms a picture image on the light sensitive drum 52 through the condensing lens 51. An electrostatic latent image formed on the light sensitive drum 52 by the focused image is developed by toner and the toner image is transferred onto a paper, achieving recording of the picture image. In the prior art picture reading and recording apparatus mentioned above, the light source is controllably driven only by turning ON and OFF voltage applied to the anode in such a manner that in a resulting or recording operation, a positive drive voltage for example is applied to the anode of each light source whereas, when the reading or recording operation is not necessary, the associated light source is put out by ceasing to apply the positive drive voltage (Japanese Application No. 124098/1983).

The prior-art light sources driven by the abovementioned manner have such luminance-to-time characteristics as shown in FIG. 9. A curve a in FIG. 9 indicates a time variation in the luminance of the light source when the anode application voltage is 35 V. It will be seen that the curve a has a very short duration in which a light quantity level Lb required for the reading or recording scan is secured. Even when the application voltage is increased to 50 V for the purpose of getting a higher luminance, the luminance is decreased at a higher rate to a constant level. As appreciated from the foregoing explanation, the prior art method and system of driving the light source have following problems.

1. Since the luminance of the light source is greatly decreased with time, it is impossible to obtain a stable, continuous reading or recording operation.
2. When it is desired to get a high luminance, the decrease in luminance must be taken into consideration and thus the application voltage must be made high, leading to the short life of the light source.
3. It is difficult to stably provide a high luminance, which inevitably lowers the reading or recording speed.

SUMMARY OF THE INVENTION

In accordance with the present invention, a voltage having a polarity opposite to that of another voltage applied to a light source in a substantial operation period is applied to the light source during periods other than the substantial operation period for reading or recording.

By applying a voltage opposite in polarity to that used in the operation period during non-operation periods, luminance of the light source can be restored, whereby the reading or recording operation can be made stable. In addition, since control for getting a high luminance can be made simple, the light source can be prolonged in operational life and the reading or recording speed can be made high.

DESCRIPTION OF THE PREFERRED EMBODIMENT

Figure 1:
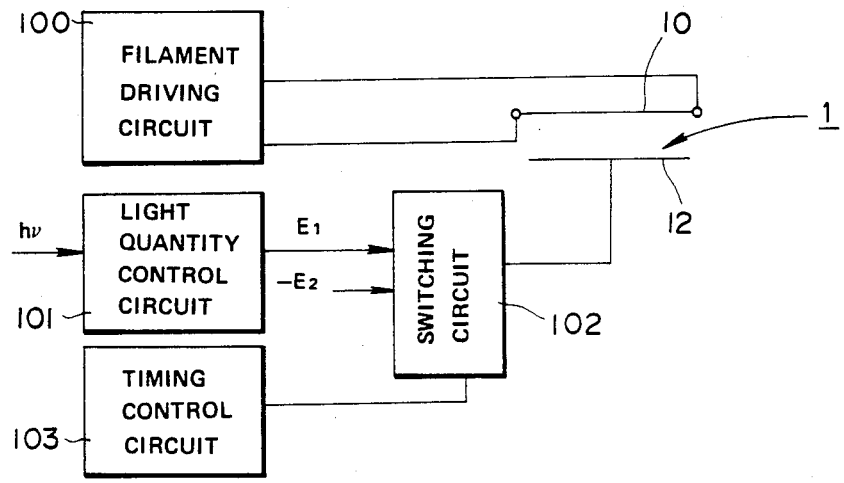
FIG. 1 is a block diagram showing an arrangement of a circuit for driving a light source in accordance with an embodiment of the present invention.
Figure 2:
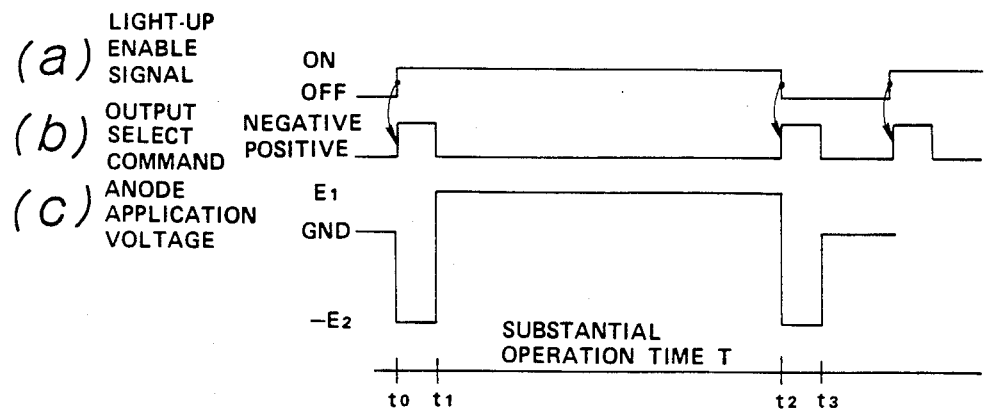
FIG. 2 is a time chart showing an example of the operation of the driving circuit shown in FIG. 1.
Figure 7:
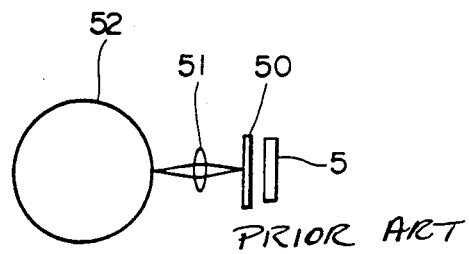
FIGS. 7 and 8 schematically show optically recording systems of optical printers having different types of light sources.
Figure 9:
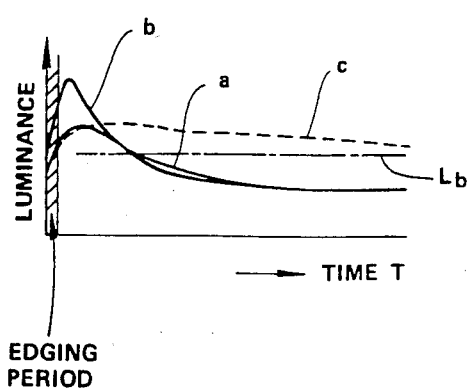
FIG. 9 is a graph showing a variation of the luminance of the light source with time driven according to a method of the present invention.

An embodiment of the present invention will be described with reference to the accompanying drawings. Referring to FIG. 1, there is shown a block diagram showing an arrangement of a light source driving circuit for use in a facsimile equipment or the like according to an embodiment of the present invention, which circuit comprises, as elements for controlling a light source such as a fluorescent indicator tube 1, a filament driving circuit 100 for supplying a predetermined voltage to a filament 10 to emit thermions therefrom, a light quantity control circuit 101 for applying positive and negative voltages E1 and −E2 to an anode 12 to control the quantity of light emitted from the fluorescent indicator tube 1 while monitoring the light quantity of the indicator tube 1, a switching circuit 102 for selectively supplying the output positive and negative voltages E1 and −E2 of the light quantity control circuit 102 to the anode 12, and a circuit 103 for controlling the timing of the selecting operation of the switching circuit 102. The operation of the circuit of FIG. 1 will be explained in detail by referring to a time chart shown in FIG. 2. First of all, when a read-out sequence is started by a command through an operator's operation for example, power (enable signal) is supplied from the filament driving circuit 100 to the filament 10 of the fluorescent indicator tube 1 at a time 't0' as shown in FIG. 2(a) so that the filament 10 becomes in a drive state. In synchronism with the rising timing 't0' of the power enable signal, an output select command for selecting the outputs of the light quantity control circuit 101, which command is sent from the timing control circuit 103 to the switching circuit 102, is shifted from its positive level to its negative level. This negative level state is maintained until a time 't1', as shown in FIG. 2(b). Therefore, for duration from 't0' to 't1', the voltage -E2 is applied from the light quantity control circuit 101 through the switching circuit 102 to the anode 12, as shown in FIG. 2(c). Since the voltage −E2 has a polarity opposite to that of the voltage E1 supplied when the flourescent indicator tube 1 is lit up, the indicator tube 1 is not lit at this stage. When the output select command sent from the timing control circuit 103 to the switching circuit 102 is shifted to its positive level at the time 't1' (refer to FIG. 2(b)), the voltage E1 is applied from the light quantity control circuit 101 through the switching circuit 102 to the anode 12 (refer to FIG. 2(c)), whereby the indicator tube 1 is lit up and thereafter scanning operation for picture reading is started and continued until a time 't2'. When the read scanning operation is completed at the time 't2', the enable signal, which has been continuously turned ON, is turned OFF (refer to FIG. 2(a)) so that the indicator tube 1 is extinguished and the output select command of the timing control circuit 103 is again shifted to the negative level (refer to FIG. 2(b)). After extinction of the indicator tube 1, the voltage −E2 is applied from the light quantity controller 101 through the switching circuit 102 to the anode 12 (refer to FIG. 2(c)). This application of the voltage −E2 to the anode 12 is maintained until a time 't3'. In this manner, by applying a voltage having a polarity opposite to the voltage in the lead to the indicator tube during a predetermined period before and after a substantial reading operation time T, luminance of the indicator tube can be restored. As a result, the present invention can provide a luminance characteristic having a small variation with time as shown by a curve (c) in FIG. 9, realizing a stable operation of the indicator tube with high luminance. Such luminance restoring operation enables a remarkable improvement in its reading accuracy. In addition, by increasing the application voltage, luminance of the light can be easily increased and good control of the light source for high luminance, the prolonged operational life of the light source and the high speed reading operation can be realized. The embodiment of the present invention has been explained in connection with a picture reading apparatus. When it is desired to apply the present invention to an optical printer using such a light source as a fluorescent indicator tube or a DC type EL panel 5 shown, for example, in FIG. 7, the aforementioned method of driving the light source for the reading operation is applied to its recording operation without any change, and a voltage of the opposite polarity is applied during a predetermined period before and after the substantial recording period. Thus, the improvement of its recording accuracy, the prolongation of life of the illuminating light source and the high speed recording operation with stable operation and a high luminance can be realized. When the DC type EL panel 5 employed, it emits a relatively small quantity of light at the current technical level and therefore the present invention cannot provide the high speed recording feature but can provide the two other features, that is, the improvement of the recording accuracy and the prolongation of the light source life.

Figure 3:
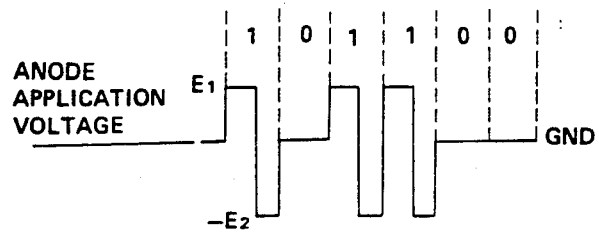
FIGS. 3 and 4 are time charts showing different examples of control of a voltage applied to an anode of the light source comprising a plurality of light source dots.
Figure 4:
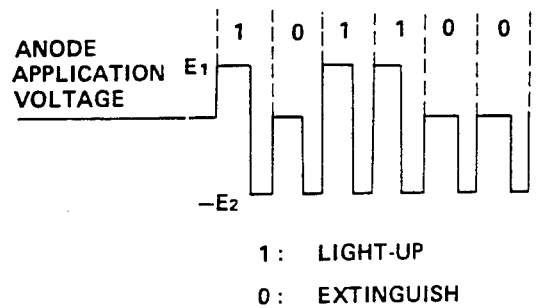
Figure 5:
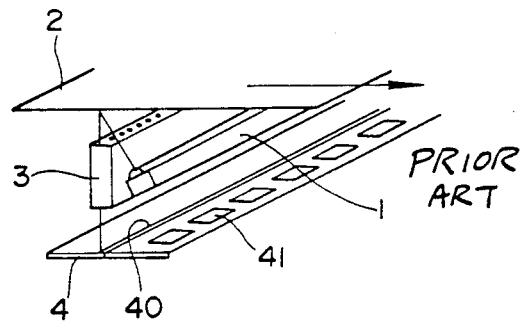
FIG. 5 shows an overall arrangement of a reading section of a picture reading apparatus.
Figure 6:
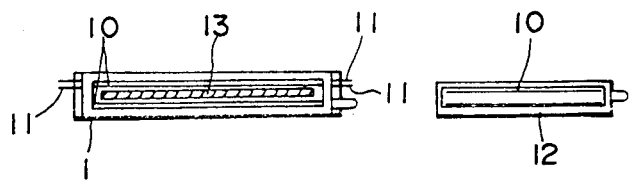
FIG. 6 schematically shows a structure of the light source used in the reading section.
Figure 8:
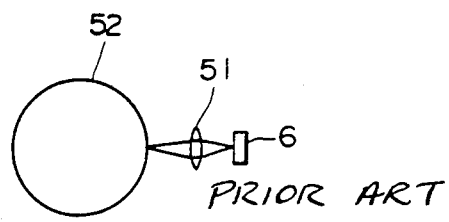

Further, the present invention can be applied to an optical printer using a fluorescent indicator tube dot array light source 6 comprising a plurality of light source dots shown in FIG. 8. In this case, the light source dots are regarded as respectively independent light sources and the voltage application control method as mentioned above is used to restore the luminance of each of the dots of the fluorescent indicator tube dot array light source 6. Thus, the present invention can provide substantially the same effect as in the previous case. FIG. 3 shows an example of the voltage application control in which an anode voltage having the opposite polarity is applied to the anodes of ones of the dots of the dot array light source 6 after the ones are lit up while the other dots are kept at the ground level. Alternatively, a voltage having the opposite polarity may be always applied regardless of whether or not the dots are lit up to restore the luminance of the dot light sources, as shown in FIG. 4.

As has been disclosed in the foregoing, in accordance with the present invention, by applying a voltage having the opposite polarity to the anode of the illuminating light source during the specific periods not contributing to the reading or recording operation, the luminance of the light source can be restored. As a result, the light source is prevented from deterioration of luminance with time, which contributes to improvement of the reading or recording accuracy to a large extent. In addition, since control for increasing the luminance can be simplified, by this invention the light source can be made long in operational life and high in reading or recording speed.

What is claimed is:

1. A method of driving a fluorescent indicator tube light source for reading a picture image, comprising a first step of applying to an anode of said fluorescent indicator tube an opposite polarity voltage having a polarity opposite to that of a voltage applied to said light source in a substantial picture-reading period, during a first predetermined period immediately before said substantial picture-reading period, a second step of applying a normal polarity voltage to said anode of the fluorescent indicator tube during the substantial picture-reading period, and a third step of applying said opposite polarity voltage to the anode of the fluorescent indicator tube during a second predetermined period immediately after the substantial picture-reading period.

2. A method of driving a light source for reading or recording a picture image comprising the steps of applying to said light source an opposite polarity voltage having a polarity opposite to a polarity of an operating voltage that places the light source in operation, and applying to said light source a voltage of the operating plurality immediately after terminating the application of the opposite polarity voltage.

3. A method as set forth in claim 2, wherein said voltage applying step comprises a step of applying to said light source said opposite polarity voltage during periods of predetermined length immediately before and immediately after said picture-reading or -recording period.

4. A system of driving a light source for picture reading or recording comprising:
means for generating a first application voltage left necessary for lighting up said light source in said picture reading or recording mode and a second application voltage having a polarity opposite to that of said first voltage;
switching means for selecting either one of said first and second application voltages generated by said voltage generating means; and
timing control means for switching said switching means to select said second application voltage during at least one predetermined period other than a substantial operating period, the predetermined period being immediately before and immediately after said substantial operation period for said reading or recording of the picture.

5. A system as set forth in claim 4, wherein said light source is a fluorescent indicator tube.

6. A system as set forth in claim 4, wherein said light source is a DC type EL panel.

7. A system as set forth in claim 4, wherein said light source is a dot array light source which comprises a plurality of mutually independent light source dots.

8. A system as set forth in claim 7, wherein said timing control means switches said switching means to select said second application voltage during latter half of a period allocated to each light source dot.

9. A method of driving a fluorescent lamp light source for reading or recording picture image, comprising the step of applying to the anode of said fluorescent lamp light source an opposite polarity voltage having a polarity opposite to that of a voltage for lighting said fluorescent lamp light source in synchronism with rise and fall of an enable signal for enabling said fluorescent lamp light source during a period when said light source is lit so as to prevent brightness of said fluorescent lamp light source from being deteriorated.

10. The method according to claim 9 wherein said enable signal is a driving signal for driving a filament of said fluorescent lamp light source.

11. A method of driving a fluorescent lamp light source having a plurality of fluorescent lamps arranged in line, wherein each fluorescent lamp of said fluorescent lamp, that is in a time sharing manner, and an opposite polarity voltage is applied to an anode of said each fluorescent lamp during a part of said allocated period, said opposite polarity voltage having a polarity opposite to that applied during a period when the fluorescent lamp is lit.

12. A method of driving a fluorescent lamp light source having a plurality of fluorescent lamps arranged in line, wherein each fluorescent lamp of said fluorescent lamp light source is lit during a period allocated to said each fluorescent lamp, that is in a time sharing manner, and an opposite polarity voltage is applied to an anode of each said fluorescent lamp during a part of said allocated period so as to refresh brightness of said fluorescent lamp light source, said opposite polarity voltage having a polarity opposite to that applied during a period when the fluorescent lamp is lit, and said opposite polarity voltage is prohibited from being applied during a period when said fluorescent lamp is not lit.

13. An apparatus for driving a fluorescent lamp light source used for reading or recording a picture image, comprising:
filament driving means for driving a filament of said fluorescent lamp light source so as to generate and enable signal for enabling the driving of said fluorescent lamp light source;
light amount control means for generating a first voltage to be applied to an anode of said fluorescent lamp light source and a second voltage having a polarity opposite to that of said first voltage;
switching means for applying said first voltage and said second voltage; and
timing control means for controlling said switching means such that said second voltage is selected to be applied to an anode of said fluorescent lamp light source lamp in synchronism with rise and fall of said fall of an enable signal supplied from said filament driving means, and said first voltage is selected to be applied to said anode during a period when said fluorescent lamp light is lit.

14. A method of driving a fluorescent lamp light source for reading or recording a picture image comprising the step of applying to the anode of said fluorescent lamp light source an opposite polarity voltage having a polarity opposite to that of a voltage for lighting said fluorescent lamp light source in synchronism with the rise and fall of an enable signal for enabling said fluorescent lamp light source during a period when said light source is lit so as to prevent the brightness of said fluorescent lamp light source from being deteriorated.

15. The method according to claim 14 wherein said enable signal is a driving signal for driving a filament of said fluorescent lamp light source.

16. A device for driving a fluorescent lamp light source used for reading or recording a picture image, comprising:
filament driving means for driving a filament of said fluorescent lamp light source so as to generate an enable signal to enabling the driving of said fluorescent lamp light source;

light amount control means for generating a first voltage to be applied to an anode of said fluorescent lamp light source and a second voltage having a polarity opposite to that of said first voltage;

switching means for applying said first voltage and said second voltage; and timing control means for controlling said switching means such that said second voltage is selected to be applied to an anode of said fluorescent lamp light source lamp in synchronism with rise and fall of said fall of an enable signal supplied from said filament driving means, and said first voltage is selected to be applied to said anode during a period when said fluorescent lamp light is lit.

* * * * *

UNITED STATES PATENT AND TRADEMARK OFFICE
CERTIFICATE OF CORRECTION

PATENT NO. : 4,796,093

DATED : January 3, 1989

INVENTOR(S) : Fumio Asano

It is certified that error appears in the above-identified patent and that said Letters Patent is hereby corrected as shown below:

Column 2, Line 10, "resulting" should be --reading--.

Column 2, Line 16, "abovemen" should be --above-men- --.

Column 3, Line 29, "102" should be --101--.

Column 5, Line 25, "plurality" should be --polarity--.

Signed and Sealed this

Twenty-seventh Day of June, 1989

Attest:

DONALD J. QUIGG

Attesting Officer

Commissioner of Patents and Trademarks